(12) United States Patent
Pipes, Jr.

(10) Patent No.: US 6,579,099 B1
(45) Date of Patent: Jun. 17, 2003

(54) FREEHAND DRAWING TRAINING AND GUIDING DEVICE

(76) Inventor: Robert Lewis Pipes, Jr., 5550 Kugler Mill Rd., Cincinnati, OH (US) 45236

( * ) Notice: Subject to any disclaimer, the term of this patent is extended or adjusted under 35 U.S.C. 154(b) by 0 days.

(21) Appl. No.: 10/047,337

(22) Filed: Jan. 14, 2002

(51) Int. Cl.⁷ .......................... G09B 11/00; G09B 11/04
(52) U.S. Cl. .......................... 434/85; 434/90; 434/91; 33/1 K
(58) Field of Search .............................. 434/81, 84, 85, 434/87, 88, 90, 433; 33/1 K, 1 G

(56) References Cited

U.S. PATENT DOCUMENTS

| | | | |
|---|---|---|---|
| 228,273 A | | 6/1880 | Peabody |
| 241,801 A | | 5/1881 | Hagan |
| 353,919 A | | 12/1886 | Charman |
| 464,359 A | | 12/1891 | Barrett |
| 574,605 A | | 1/1897 | Hailes |
| 599,402 A | | 2/1898 | Richter |
| 1,622,229 A | | 3/1927 | Ormiston |
| 1,821,252 A | | 9/1931 | Woods |
| 1,992,083 A | | 2/1935 | McDonald |
| 2,263,101 A | * | 11/1941 | Perry ........................... 33/277 |
| 2,472,148 A | | 6/1949 | Orazi |
| 3,063,162 A | | 11/1962 | Quinn |
| 3,086,296 A | | 4/1963 | Bergstrom |
| 3,660,903 A | * | 5/1972 | Caperton, Jr. ................. 33/1 K |
| 4,798,537 A | | 1/1989 | Ragouzis |
| 5,580,250 A | * | 12/1996 | McKewen .................... 434/85 |
| 5,749,149 A | * | 5/1998 | Claytor .......................... 33/1 F |
| 5,785,528 A | * | 7/1998 | Jones-Fenleigh et al. ... 434/100 |

OTHER PUBLICATIONS

Edwards, Betty, *Drawing on the Right Side of the Brain*, 1989, pp. 118, 119, 120, 121, and 124, 125.
Hutter, Heribert, *Drawing History and Techique*, 1968, p. 145.
The Dürer Grid, website catalogue page. Dick Blick Art Materials, printed Apr. 12, 2002.

* cited by examiner

Primary Examiner—Derris H. Banks
Assistant Examiner—Dmitry Suhol
(74) Attorney, Agent, or Firm—Michele M. Tyrpak; Hudak, Shunk & Farine Co, LPA

(57) ABSTRACT

The invention relates to freehand drawing tools and, specifically, to an improved device for training and guiding aspirant and accomplished artists to produce accurate freehand drawings. The device facilitates using the technique of correlating a visual image to a reference grid and drawing a representation of the image on a drawing surface with a proportionally identical grid. The device comprises a series of sighting grid plates through which a subject to be drawn is viewed, a series of grid transfer stencils used to set a similar grid on a drawing surface, a means for supporting the sighting grid plates in position to be looked through by an artist viewing a subject, and a means for applying a color contrasting substance to the drawing surface through the holes in the grid transfer stencils.

17 Claims, 9 Drawing Sheets

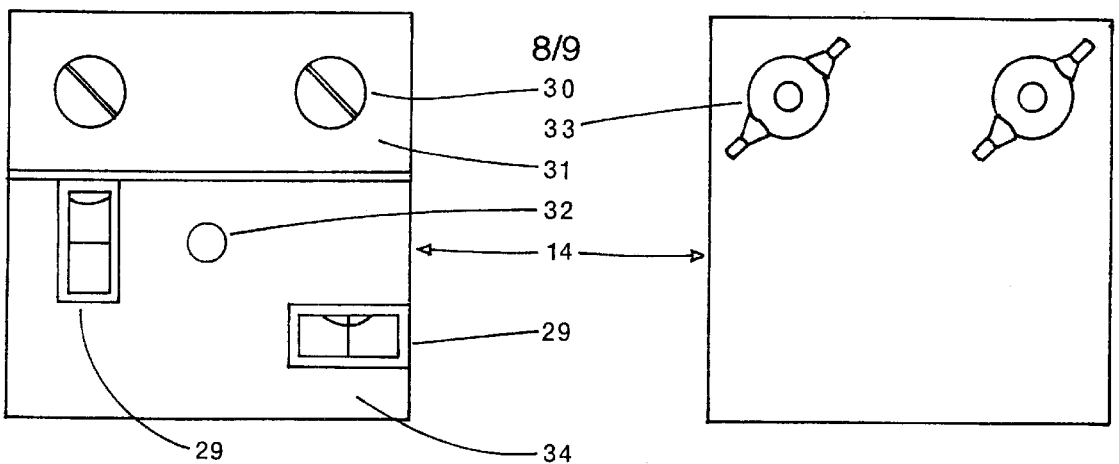
FIG. 8a  FIG. 8b
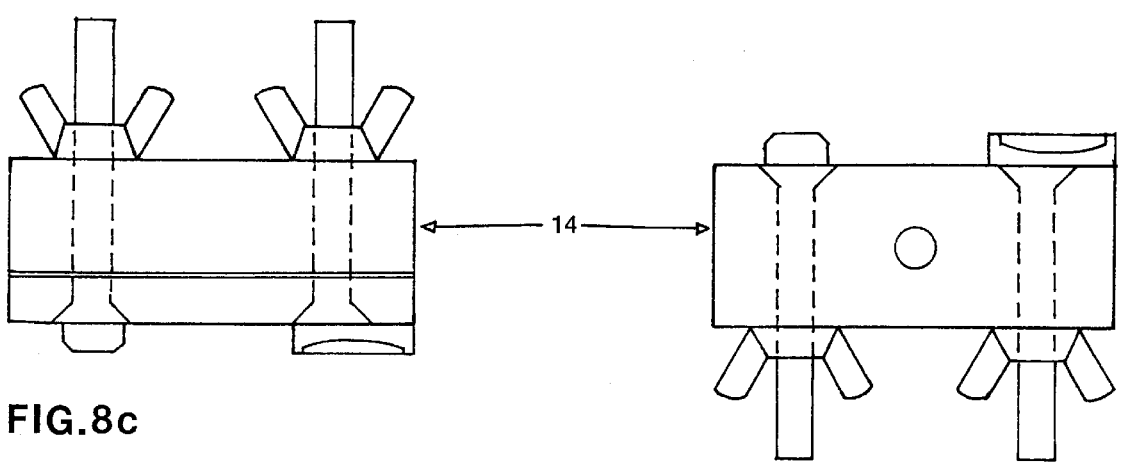
FIG. 8c
FIG. 8d
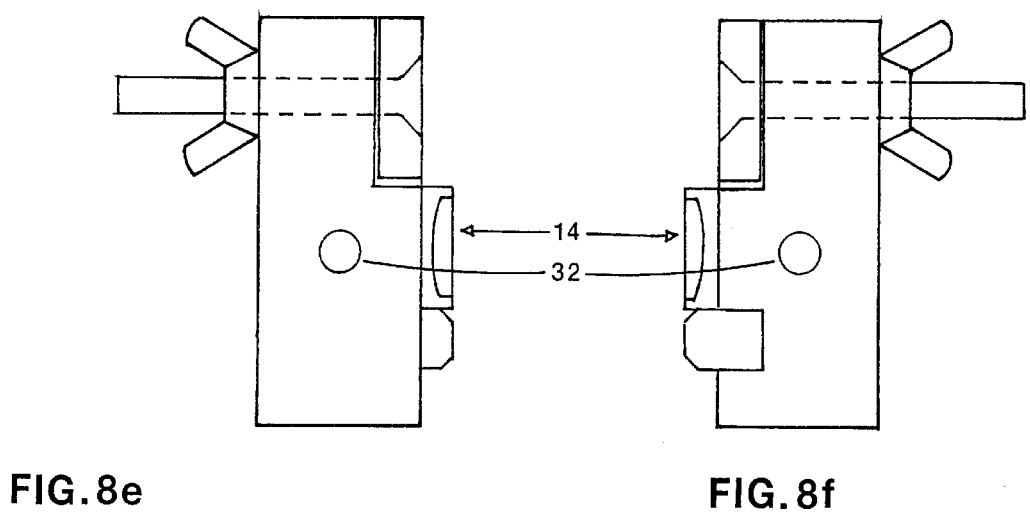
FIG. 8e  FIG. 8f

FREEHAND DRAWING TRAINING AND GUIDING DEVICE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

This invention relates to freehand drawing tools, specifically to an improved device for training and guiding aspirant and accomplished artists to produce accurate freehand drawings. The device facilitates the technique of viewing a subject juxtaposed to a reference grid and drawing a corresponding image juxtaposed to a proportionally identical grid on a drawing surface. The technique helps artists to visualize three dimensional form, proportion, and perspective as two-dimensional shapes, and then accurately draw the two-dimensional shapes. Also, the technique is used to copy two dimensional drawings and photographs.

The effectiveness of the sighting grid device as a drawing tool is strongly supported by historical evidence that reveals that renowned masters of drawing such as Leonardo da Vinci (1452–1519), Albrecht Durer (1471–1528 Vincent Van Gogh (1853–1890), and Edgar Degas (1834–1917) used sighting grid devices.

However, a universal shortcoming of the sighting grid devices, which were used by the masters of drawing mentioned above, and the numerous devices that have been invented and patented as improvements to the sighting grid device, is the absence of a practical means of putting a representation of the sighting grid on the artist's drawing surface. Drawing a grid is time consuming especially when done in a precise manner. Almost all devices, with a few exceptions, either do not address the issue or simply suggest that a grid be drawn on the artist's drawing surface. U.S. Pat. No. 0,228,273 to William B. O. Peabody (1880) is a device that uses a mat with ruled markings that serves to guide an artist in drawing a grid in a precise manner on his or her drawing surface, but it does not negate the effort required to draw the grid each time a drawing is started. U.S. Pat. No. 3,086,296 to E. V. Bergstrom (1963) proposed that a grid be pre-printed on special paper made for use with the patented viewing device. The obvious problem with any drawing produced on preprinted grid paper is that the grid is indelible and will remain visible in the artwork with perhaps the exception of a painting done with opaque paints. Once the grid has served its useful purpose, it should be removed so as not to detract from the drawing itself. U.S. Pat. No. 0,2282,273 to William B. O. Peabody (1880) proposed drawing the grid onto the artist's drawing surface with a charcoal pencil that could easily be wiped away when the artist no longer needed the grid to aid in drawing. The drawbacks to this approach are that the drawing of a line requires pressure to be applied to the drawing surface, which makes the complete removal of the grid difficult, and time and effort are required to draw a grid onto the artist's drawing surface before freehand drawing can commence. The process of drawing a grid on a drawing surface is not practical for a device intended to train its users to draw, because student artists will want to be sketching quickly and repeatedly. The student will find having to draw a grid before starting each sketch to be both inconvenient and time consuming. The recreational artist, who draws for pleasure, is intent on drawing subjects, not on drawing grids. Prior art has attempted to solve this problem. U.S. Pat. No. 2,472,148 to Anthony A. D'Orazi (1949) uses two complementary sheets, one for viewing a subject and one for guiding line-work on the artist's drawing surface. The sheets have areas cut out with sheet material remaining between the cut outs that become narrow connectors. The connectors are marked with centerlines and subdivision marks. The difficulty in using this device is that the artist is unable to draw fluid lines because the connecting portion of the sheet interrupts the artist's line-work each time the lines cross the sheet material.

When viewing a drawing subject through a sighting grid plate, the artist must always view the subject from the same viewpoint. Some of the existing viewing grid devices include a sight or eyepiece on which the artist can rely to maintain a constant viewpoint. U.S. Pat. No. 1,821,252 to Ruben E. Woods (1931) is an example. Although the sight or eyepiece will ensure that the artist is viewing from the same viewpoint, looking through a sight or eyepiece is not conducive to oscillating visual focus between the drawing subject and the drawing surface. Another approach to ensuring that the artist can return to the original viewpoint is a feature of U.S. Pat. No. 1,992,083 to J. J. McDonald (1935), which uses special markers that are strategically placed on the grid at points that correspond to significant points on the subject being viewed through the view-sheet. Placing the markers on the grid is necessary because the grid is formed by a series of wires stretched across the frame. McDonald suggests that certain grid lines on the view-sheet can be given particular markings and can be lined up with particular parts of a subject being viewed, so that the original alignment can be accurately repositioned at any time. This means of recording the original viewpoint requires that the grid be positioned for purposes other than the artist's preferred composition of the drawing. Another way an artist can document a viewpoint is by developing a drawing to the point where the relationship of the subject to the grid is clearly represented. Relying on the artist's drawing to record the original viewpoint requires that the artist draw a certain amount of the subject on his or her drawing surface before moving freely. This method of recording the artist's view point does not provide the artist with confirmation that he or she is in position when looking at a subject through a sighting grid plate, which is the critical time for conformation of the artist's position.

An essential element of a sighting grid device is the support of the sighting grid. The measure of the effectiveness of the support is the flexibility with which the sighting grid can be positioned and the versatility of the support in terms of where it can be mounted. At the same time, the support must be capable of keeping the sighting grid in a constant position. Prior art shows varying degrees of success accomplishing these three performance criteria, but all prior art leaves opportunity for improvement. A commercially available device that uses the grid as a drawing tool is "The Durer Grid". The Durer Grid is a 40"×40" grid set in a wooden frame and stand that can be extended to a height of six feet. This product is a studio floor model, not a portable device. "The Durer Grid" appears to be based on U.S. Pat. No. 4,798,537 to Perry N. Ragouzis. Another tool, U.S. Pat. No. 3,086,296 to E. V. Bergstrom (1963) uses a bendable member to hold the viewer in position. The device has positioning flexibility that makes it useful. However, when subjected to repeated bending, the copper tubing that is used for the bendable arm will break due to the deterioration of the metal.

There is a tendency for an artist to experience disorientation when viewing a subject through a sighting grid plate. Since the grid simplifies a subject by dividing it into smaller less complex parts, the artist using the grid is focused on the parts, not on the whole subject. A homo-genius grid does not provide any orienting references. U.S. Pat. No. 3,086,296, to E. V. Bergstrom (1963) addresses the disorientation experienced when viewing a subject with a sighting grid by creating a system of matching indicia in the form of dots to be placed on the viewer and on the drawing paper. The dots orient the artist to certain focal points but they are not necessarily effective in orienting the artist to an entire field. And, there may not be focal points that warrant special emphasis or attention from the artist.

BRIEF SUMMARY OF THE INVENTION

In accordance with the present invention, a Freehand Drawing Training and Guiding Device comprises a series of sighting grid plates, through which the subject to be drawn is viewed; a series of grid transfer stencils, which are used to superimpose a similar grid on the artist's drawing surface; a means of supporting the sighting grid plates in position for viewing by the artist; and a means of applying a color contrasting substance to the artist's drawing surface through the holes in the grid transfer stencils. The device can be used to accurately draw a real life subject, or a photograph, or a drawing.

Accordingly, besides the objects and advantages of the drawing device described in my above patent, several objects and advantages of the present invention are:

a. to provide a device that is an ideal viewfinder for composing drawings;

b. to provide a device that facilitates viewing a subject juxtaposed to a reference grid, which sub-divides the subject into sections that are less complex than the scene in its entirety, and facilitates drawing a corresponding image identically juxtaposed to a grid of equal proportion on a drawing surface;

c. to provide a device that can be positioned to suit the ergonomic requirements of the artist, and that is capable of remaining in position for the duration of time demanded by the artist, and that is flexible with regard to the variety of things to which it can be mounted;

d. to provide a device that allows the user to effortlessly reposition himself or herself on an original viewpoint after having moved around naturally when not sighting through the grid;

e. to provide a device that is designed to balance the benefits of subdividing the scene into simplified sections and maintaining orientation to the whole;

f. to provide a device with which a representation of the sighting grid is applied to the artist's drawing surface so that virtually no time or effort is required to prepare to draw with the aid of the device;

g. to provide a device that allows the grid that is applied to the artist's drawing surface to be completely removed after it has served its purpose so that the grid does not detract from the drawing itself;

h. to provide a device that allows the artist to choose the size of his or her drawing;

i. to provide a device that is portable and that can be assembled into one unit for storage.

Still further objects and advantages will become apparent from a consideration of the ensuing description and drawings.

BRIEF DESCRIPTION OF THE SEVERAL VIEWS OF THE DRAWING

FIG. 8a shows a frontal view of the coupling block.

FIG. 8b shows a back view of the coupling block.

FIG. 8c shows a top view of the coupling block.

FIG. 8d shows a bottom view of the coupling block.

FIG. 8e shows a left side view of the coupling block.

FIG. 8f shows a right side view of the coupling block.

Figure 1:
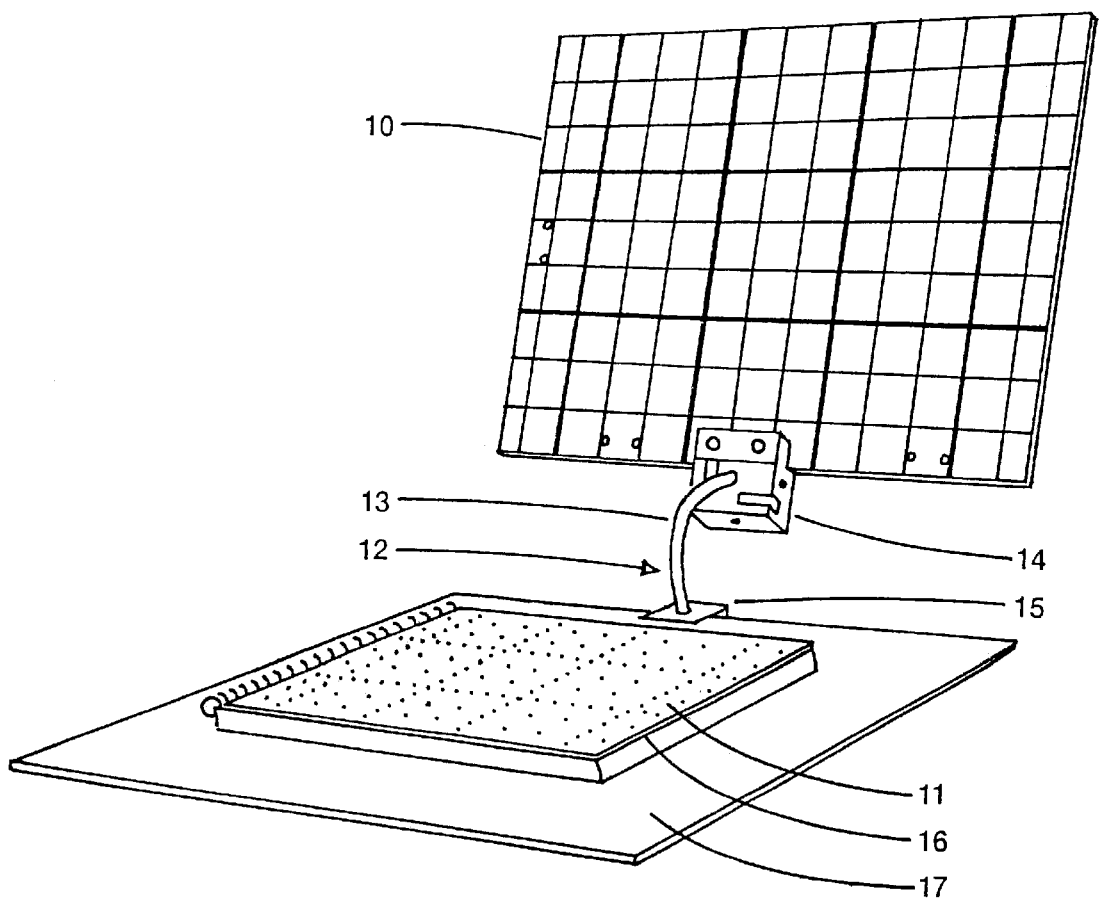
FIG. 1 shows a perspective view of a sighting grid plate mounted to a drawing board.

REFERENCE NUMERALS IN DRAWINGS:

10 Sighting Grid Plate
11 Grid Transfer Stencil
12 Bendable Arm Assembly
13 Flex Arm
14 Coupling Block
15 Clamp
16 Drawing Surface
17 Drawing Board
18 Easel
19 Charcoal Powder Deposits
20 Tripod
21 Transparent Sheet
22 Grid
23 Primary Grid Lines
24 Secondary Grid Lines
25 Attachment Holes
26 Transparent Sheet
27 1/16" Diameter Hole
28 Felt Pad
29 Level Vial
30 1/4–20 Bolt
31 Pressure Bar
32 1/4–20 Female Tread Insert
33 Wing Nut
34 Body

DETAILED DESCRIPTION OF THE INVENTION

Figure 2:
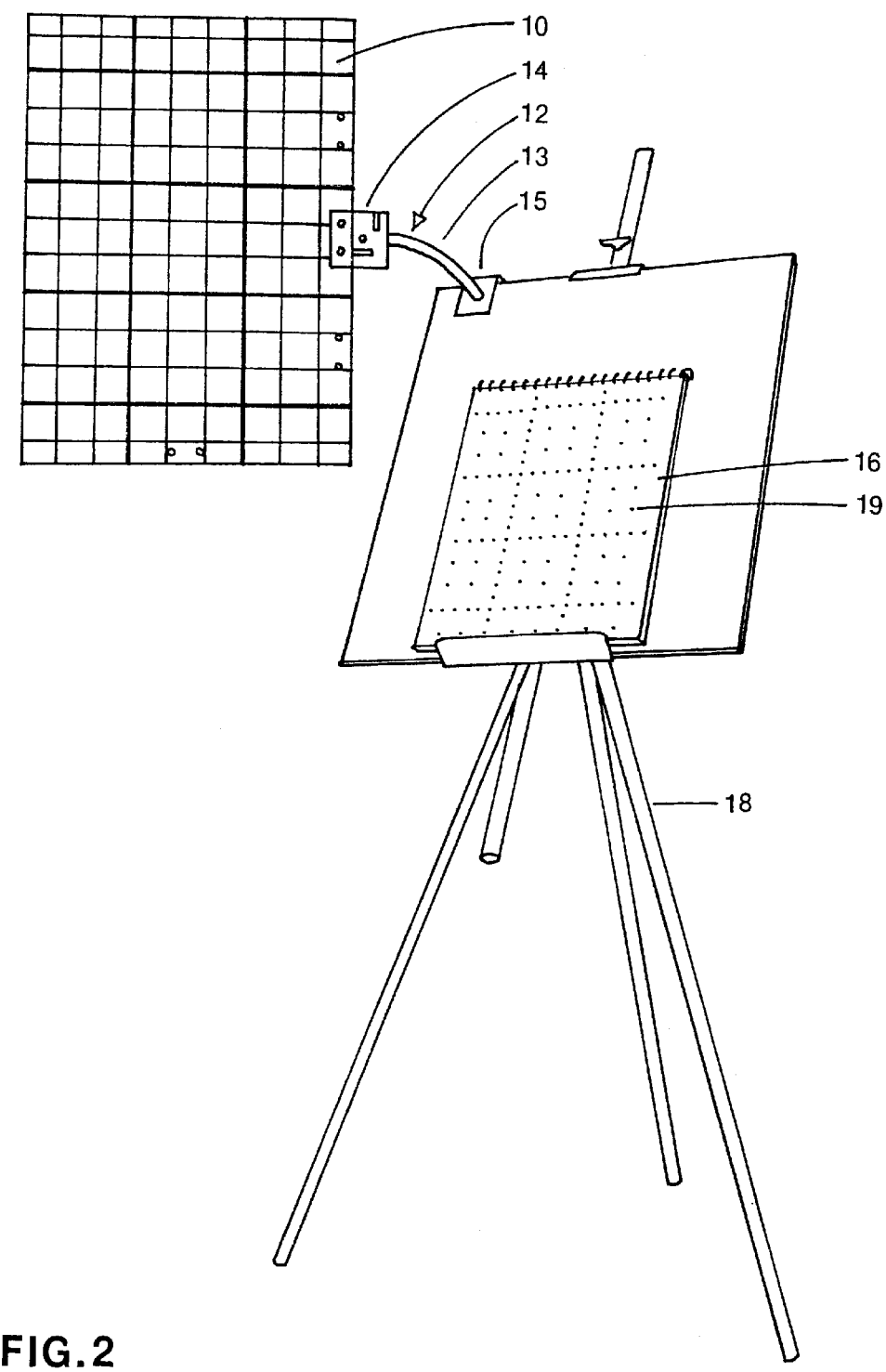
FIG. 2 shows a perspective view of a sighting grid plate mounted to an easel.
Figure 3:
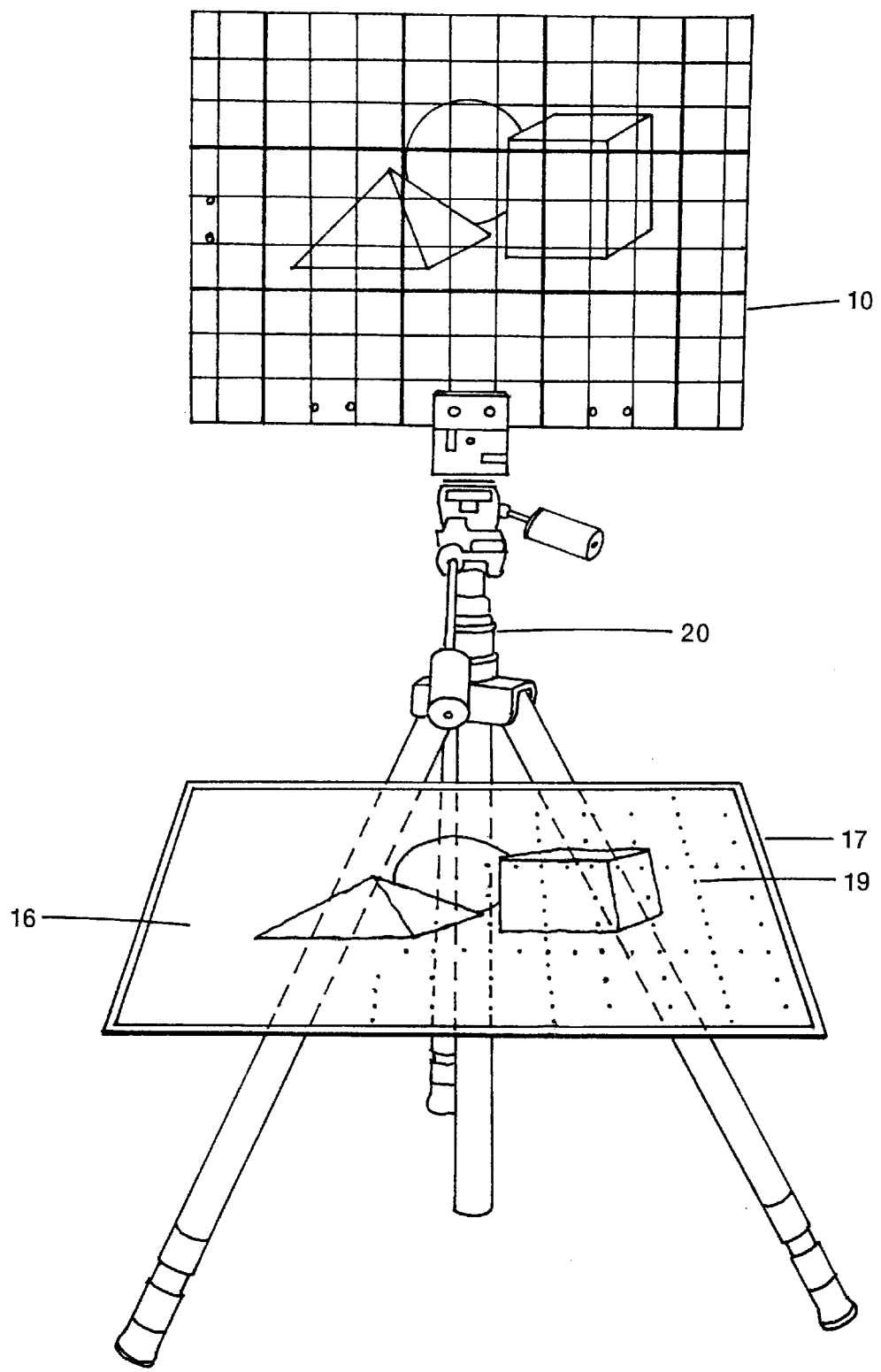
FIG. 3 shows a perspective view of a sighting grid plate mounted to a tripod.

A preferred embodiment of the freehand drawing training and guiding device is shown by three perspective views of the present invention. FIG. 1 illustrates the device mounted to a drawing board 17. The main parts of the device are a sighting grid plate 10, a grid transfer stencil 11, a bendable arm assembly 12 comprised of a flex arm 13 with a coupling block 14 attached to one end and a clamp 15 attached to the other end. The sighting grid plate 10 is attached to a coupling block 14. The clamp 15 is attached to a drawing board 17. The grid transfer stencil 11 is positioned on top of the artist's drawing surface 16 ready for transferring a representation of the grid to the artist's drawing surface 16. FIG. 2 illustrates the invention mounted to an easel 18. The main parts of the device are a sighting grid plate 10, a grid in the form of charcoal powder deposits 19 aligned in a grid pattern that have been transferred to the drawing surface 16 with a grid transfer stencil (not shown), a bendable arm assembly 12 comprised of a flex arm 13 with a clamp 15 attached to one end and a coupling block 14 attached to the other end. The sighting grid plate 10 is attached to the coupling block 14. The clamp 15 is attached to a drawing board 17 mounted on an easel 18. FIG. 3 illustrates a sighting grid plate 10 mounted to a tripod 20. In front of the sighting grid plate 10 is a drawing board 17 with the artist's drawing surface 16 placed on it and prepared with a representation of a grid that has been transferred with a grid transfer stencil (not shown) to the artist's drawing surface 16 in the form of charcoal powder deposits 19 (shown partially removed) aligned in a grid pattern. The image viewed behind the sighting grid plate 10 is shown drawn on the artist's drawing surface 16. The drawing board 17 is independent of the tripod 20.

Figure 4:
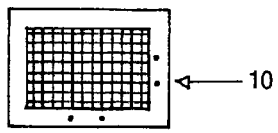
FIG. 4 shows a frontal view of a series of sighting grid plates.
Figure 4:
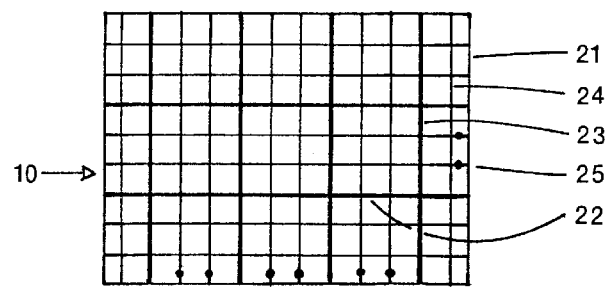
Figure 4:
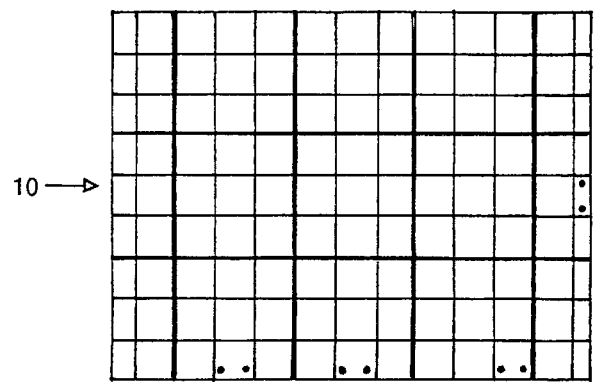

FIG. 4 shows a series of sighting grid plates 10 made of transparent sheets 21 (polycarbonate or acrylic) in a range of sizes (6"×8", 13.5"×18", 18"×24") with a grid 22, comprising primary grid lines 23 and secondary grid lines 24, either inked or etched on the backside surface. The grid 22 on each sheet in the series is proportionally identical. The grid 22 on the 6"×8" sheet is composed of lines at ½" intervals. The overall grid area on the sheet is 4"×6", which leaves a 1" wide margin around the sheet for the attachment of a coupling block (not shown) and for adhesive tape (not shown) that holds a photograph in position on the back of the sighting grid plate 10. The grid 22 on the 13.5"×18" sheet is composed of lines at 1.5" intervals; and the grid 22 on the 18"×24" sheet is composed of lines at 2" intervals. The long dimension of the transparent sheet 21 is accented three times, centered about the center of the sighting plate 10, with 3 subdivisions within each primary grid subdivision. The short dimension of the transparent sheet 21 is accented three times, centered about the center of the sighting plate 10, with 3 subdivisions within each primary grid subdivision. Each sighting grid plate 10 has three sets of attachment holes 25.

Figure 5:
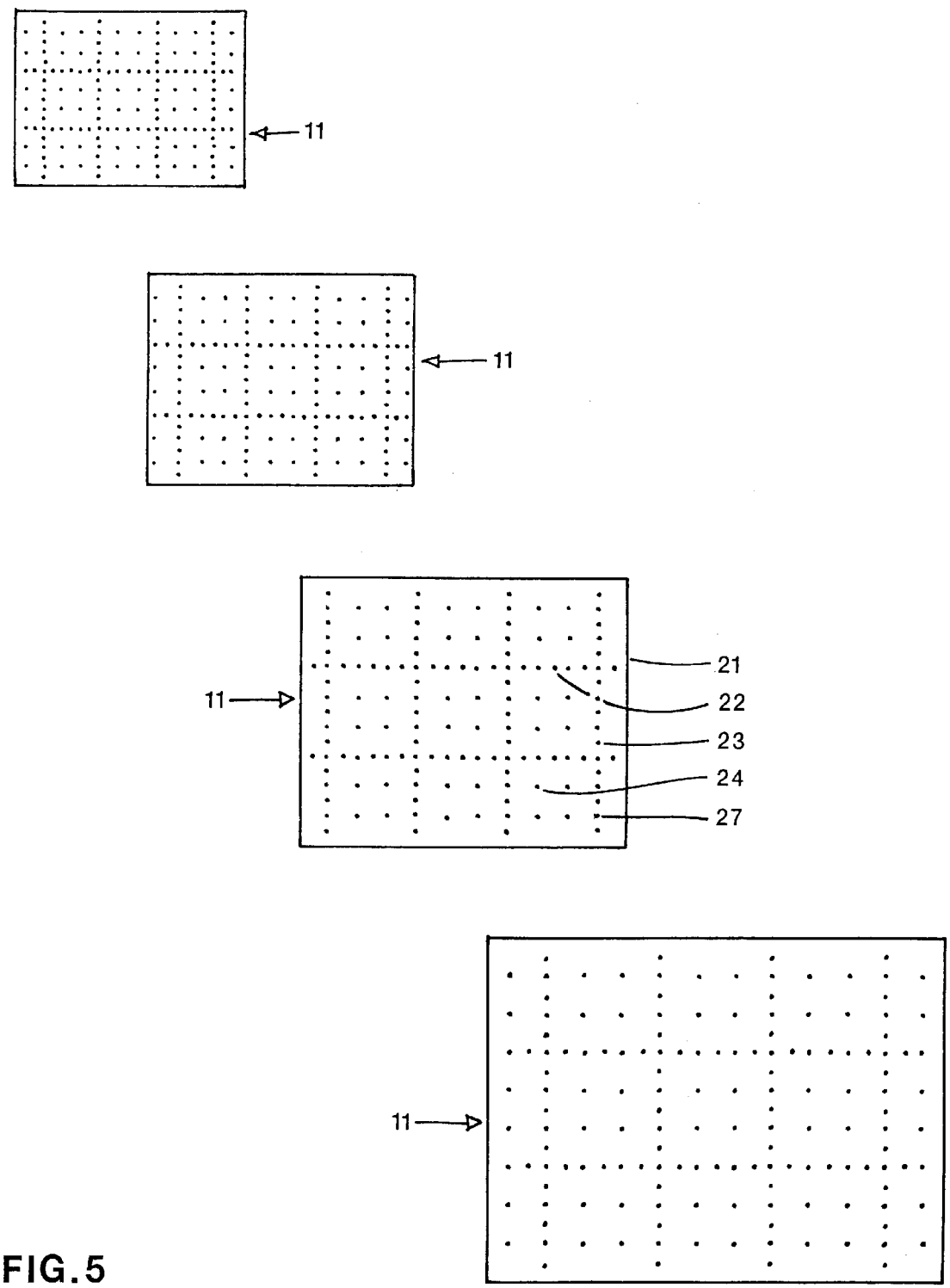
FIG. 5 shows a frontal view of a series of grid transfer stencils.

FIG. 5 shows a series of grid transfer stencils 11 made of transparent sheets 21 (polycarbonate or acrylic) in a range of sizes (9"×12", 11×14", 14"×17", 18"×24") with a grid 22 that corresponds to the grid on the sighting grid plates (not shown). The grid 22 on the transfer stencils 11 is represented by 1/16" diameter holes 27 at the grid line intersection points, and the primary grid lines 23 are emphasized by additional 1/16" diameter holes 27 centered between the grid line intersection points. The grid 22 on each sheet 21 is proportionally identical. The grid 22 on the 941 ×12" sheet 21 is composed of aligned holes at 1" intervals; the grid lines on the 11"×14" sheet is composed of aligned holes 27 at 1.222" intervals; the grid on the 14"×17" sheet 21 is composed of aligned holes 27 at 1.556" intervals; and the grid 22 on the 18"×24" composed of aligned holes 27 at 2" intervals. The long dimension of the transparent sheet 21 is accented three times, centered about the center of the sheet, with three subdivisions within each primary grid subdivision. The short dimension of the transparent sheet 21 is accented three times, centered about the center of the sheet 21, with three subdivisions within each primary dividing grid.

Figure 6:
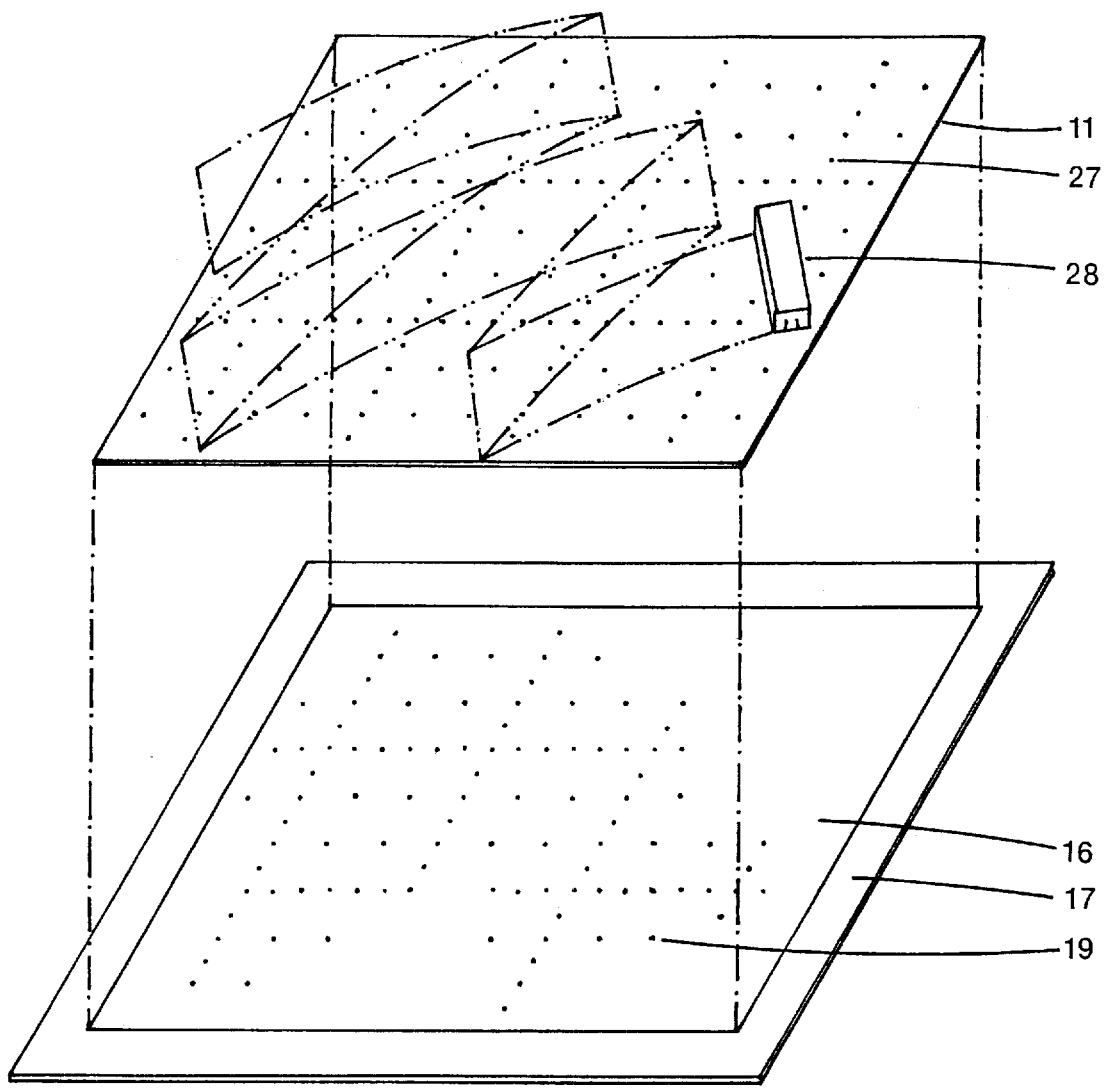
FIG. 6 shows the grid transfer process.

FIG. 6 shows an exploded perspective view of a grid transfer stencil 11, being used to transfer a representation of the grid on a sighting plate grid (not shown) to the artist's drawing surface 16. The parts of the device used to transfer the grid to the artist's drawing surface 16 are the grid transfer stencil 11 and a powder filled felt pad 28. The process by which the grid is transferred to the artist's drawing surface entails rubbing the powder filled felt pad 28 over the holes 27 in the grid transfer stencil 11, which causes the charcoal powder to release from the felt pad by friction. The charcoal powder is deposited onto the artist's drawing surface 16 at points contained by the holes 27 in the grid transfer stencil 11.

Figure 7:
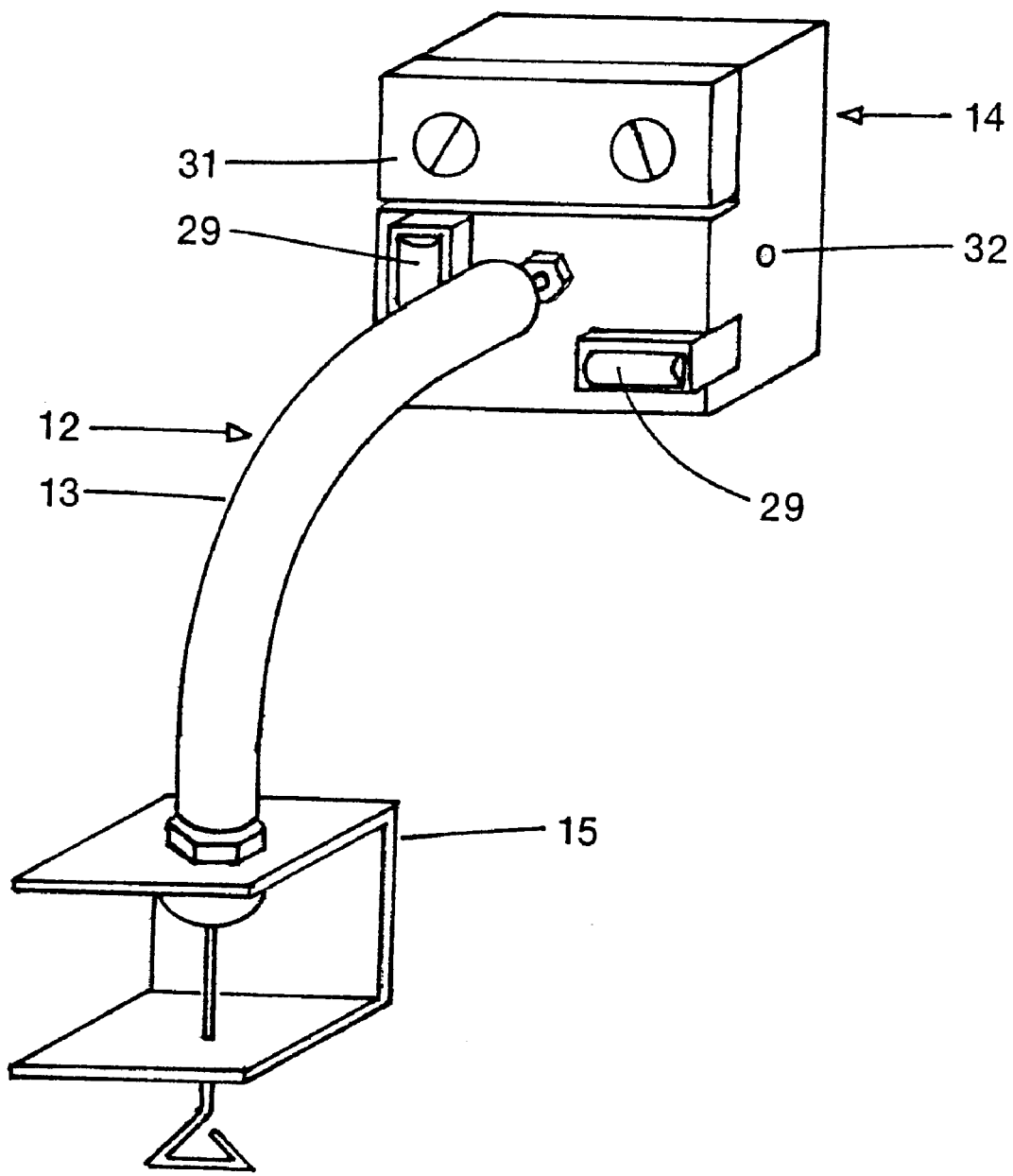
FIG. 7 shows an isometric view of the bendable arm assembly.

FIG. 7 shows an isometric view of a bendable arm assembly 12 that holds a sighting grid plate (not shown) in a position desired by the artist. The main parts of the bendable arm assembly 12 are a clamp 15 attached to a flex arm 13 at one end and a coupling block 14 attached to the flex arm 13 at the other end. The coupling block 14 has ¼–20 female thread inserts 32 to connect the flex arm 13 to the coupling block 14. A pressure bar 31 removably attaches the sighting grid plate 10 to the coupling block 14. Two level vials 29, that are integral to the coupling block 14, and that are oriented at 90 degrees to each other, ensure that the sighting grid plate 10 is set in a plumb position.

FIGS. 8a, 8b, 8c, 8d, 8e, and 8f show all sides of a coupling block 14. The coupling block has ¼–20 female thread inserts 32 in the bottom, in the front, and in both sides to connect the coupling block 14 to a flex arm (not shown) or to a tripod (not shown). In the front side of the coupling block 14 are two level vials 29, integral to the coupling block 14, oriented at 90 degrees to each other, which ensure that the sighting grid plate (not shown) is set in a plumb position. The sighting grid plate (not shown) is secured to the coupling block 14 with a pressure bar 31. The pressure bar 31 is tightened against the body 34 of the coupling block by two ¼–20 bolts 30 with wing nuts 33.

Figure 9:
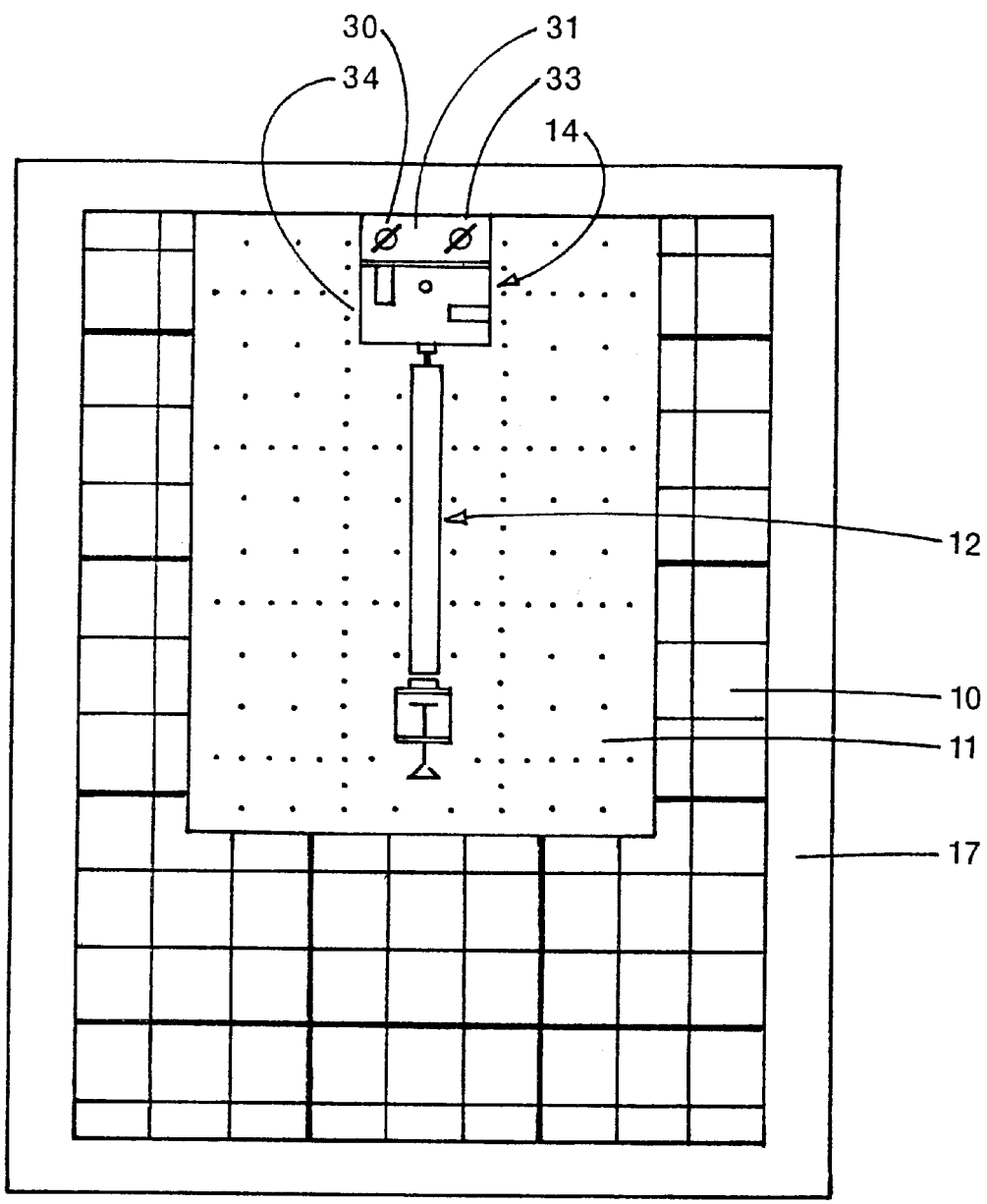
FIG. 9 shows the freehand drawing training and guiding device assembled for transport or storage.

FIG. 9 shows the freehand drawing training and guiding device assembled for transport or for storage. The ¼–20 bolts 30 with wing nuts (not shown) that secure the pressure bar 31 to the body 34 of the coupling block 14 connect the bendable arm assembly 12, grid transfer stencil(s) 11, sighting grid plate(s) 10, and drawing board 17 together. The ¼–20 bolts 30 of the pressure bar 31 connect the bendable arm assembly 12, the sighting grid plate(s) 10, the grid transfer stencils(s) 11, and the drawing board 17 together. The wing nuts 33 securely hold the pieces together.

An alternate embodiment of FIG. 2 is the device from the description above except the clamp 15 is attached to a canvas surface or directly to an easel 18.

A first additional embodiment of FIG. 3 is the device from the description above except with the placement of a photograph or a drawing behind a sighting plate 10 in order to be a drawing subject. The photograph or drawing is held in place by tape.

A first additional embodiment of FIG. 4 is the device from the description above except with a mirror surface sighting grid plate 10 of a series of mirror surface sighting grid plates 10 for self-portraiture.

A first additional embodiment of FIG. 5 is the device from the description above except with the transparent sheets 21 being both sighting grids plates and grid transfer stencils in a series or individually.

A second additional embodiment of FIG. 5 is the device from the description above except with a mirror surface grid transfer stencil 11 or a series of mirror surface grid transfer stencils 11 for self-portraiture.

From the description above, a number of advantages of my invention become evident.

The usefulness of the device starts with the composition of a drawing. An artist composes a drawing by selecting from a series of sighting grid plates 10 that are used as viewfinders. Viewing a subject through the sighting grid plates 10 allows the artist to see the drawing subject in a framed context that replicates the proportions of the artist's drawing surface 16.

The device provides a range of ways to support the sighting grid plate 10 selected, including tripod 20 mounting, easel 18 mounting, drawing board 17, or table mounting. Each way of mounting the sighting grid plate 10 has its advantages depending on where the artist is, personal preference, and the length of time to be spent drawing. The sighting grid plate 10 is attached to the coupling block 14 by a pressure bar 31 that clamps the sighting grid plate 10 to the coupling block 14 with two ¼–20 bolts 30 with wing nuts 33 allowing for finger tightening. When the coupling block 14 is mounted to a tripod 20, a ¼–20 female thread insert 32 on the bottom of the coupling block 14 is the point of attachment. When the artist opts to mount the sighting grid plate 10 to an easel 18, a drawing board 17, or to a table, the coupling block 14 is attached to the bendable arm assembly 12, which is a flex arm 13 with a ¼–20 bolt 30 at one end and a clamp 15 at the other end. The clamp 15 is secured to an easel 18, a drawing board 17, or to a table.

Flexibility in the positioning of the sighting grid plate 10 ensures that the artist is able to position the sighting grid plate 10 in the position that corresponds to the drawing composition previously established. When the sighting grid plate 10 that is attached to the coupling block 14 is mounted to a tripod 20, the tripod 20 enables flexibility in positioning the sighting grid plate 10; when the sighting grid plate 10, attached to the coupling block 14, is mounted to an easel 18, a drawing board 17 or a table, the coupling block is attached to a flex arm 13 with a clamp 15, which is attached to an easel 18, a drawing surface 16 or to a table. The flex arm 13 enables flexibility in positioning the sighting grid plate 10. Level vials 29 integral to the coupling block 14 provide a reference for the artist to plumb the sighting grid plate 10.

The coupling block 14 is equipped with ¼–20 female thread inserts 32 in the front, the bottom and in each side of the coupling block 14 so that the flex arm 13 will not be required to bend in a direction that reduces its holding power. Varying the orientation of the coupling block 14 when it is attached to the flex arm 13 ensures that the flex arm 13 will not be required to bend in a direction that compromises its holding strength.

Once the artist has positioned the sighting grid plate 10 so that he or she sees the subject to be drawn in the context of the sighting grid plate 10 that defines the selected composition, then the artist selects the size of the drawing surface 16.

A grid transfer stencil 11 that matches the size of the drawing surface 16 is placed over the drawing surface 16. Using a felt pad 28 filled with powdered charcoal, the artist rubs the felt pad 28 on the grid transfer stencil 11 that is perforated by ¹⁄₁₆-inch holes 27 aligned in a pattern that matches the grid 22 on the sighting grid plate 10. The friction resulting from the felt pad 28 rubbing against the edge of the small holes 27 in the grid transfer stencil 11 causes the charcoal powder to release from the felt pad 28 and descend by gravity onto the artist's drawing surface 16 leaving a charcoal powder deposit 19 confined by the ¹⁄₁₆ diameter holes 27. Since the only pressure used to apply the charcoal powder to the artist's drawing surface 16 is the force of gravity, the charcoal powder deposits 19 can be easily and completely removed from the artist's drawing surface 16 at the time deemed appropriate by the artist.

At this time the artist is prepared to draw with the aid of the freehand drawing training and guiding device. For ease of use the artist positions his head so that the focus of his or her vision can oscillate between looking at the drawing subject through the sighting grid plate 10 and the drawing surface 16 by moving his or her eyes only, not his or her head. This technique ensures that the artist holds his or her point of view when drawing. To eliminate parallax vision when viewing the drawing subject thought the sighting grid plate 10, the artist closes his or her non-dominant eye. This ensures that the relationship of the sighting grid 10 to the image beyond does not change. An added advantage to closing one eye is that depth perception is reduced which enhances the artist's ability to see three dimensional form as two dimensional shapes, which is how form is represented in drawings.

So that the process of drawing with the aid of the device is both natural and comfortable, the artist records his or her view point by marking anything from positioning markers at key reference point(s) of the subject to shapes outlining forms directly onto the sighting grid plate 10 with a water soluble marker. After having done so, the artist is free to move in a natural manner, yet is able to return to the original point of view by realigning the benchmark or shapes on the sighting grid plate 10 with the corresponding part of the image being drawn. The artist can draw as much of the subject on the sighting grid plate 10 as desired. For the beginner, the technique of practicing drawing directly onto the sighting grid plate 10 is a good way to get started with immediate success.

The artist views the subject through a grid 22 that serves to sub-divide the subject into sections that are less complex than the subject in its entirety, and therefore is easier to draw. The artist matches in his or her drawing the exact shape and lengths of lines and their angle and position in relation to the horizontal and vertical lines of the sighting grid 10. As the artist draws lines that depict what is seen, he or she will produce a drawing of the subject, exactly as it is seen.

After the artist has developed the drawing to the point where the reference grids 22 have served their useful purpose, the charcoal powder deposits 19 are removed from the drawing surface 16 while not affecting the line work of the drawing. When the drawing medium is non-smearing, such as graphite, the deposits 19 are removed by gently wiping or brushing the drawing surface 16. When the drawing medium is a type that smears, such as charcoal, the deposits 19 are removed with a kneaded eraser from areas in close proximity to the line-work in addition to gently wiping or brushing the remainder of the drawing surface 16.

After the grid 22 has been removed from the artist's drawing surface 10, the artist can proceed with completing the drawing or painting. The sighting grid plate 10 is now moved out of the line of view of the drawing subject and the drawing or painting is completed.

Once the drawing process is complete, the artist cleans the surface of the sighting grid plate 10 with a water-dampened cloth.

Accordingly, the freehand drawing training and guiding device provides an effective and practical tool that serves to guide an artist who is creating a drawing from a real life scene, object, person, or from a photograph or drawing. Line drawings created with the aid of the tool are accurate representations of the subject being drawn because the artist exercises sighting techniques which focus the artist on seeing things as they actually appear and subsequently drawing them as they are seen. For the accomplished artist the tool serves to increase the accuracy of a drawing. For the amateur or recreational artist, the tool ensures accurate line drawing even without frequent practice.

In addition to the usefulness of the invention as a guiding device for professional and amateur artists, the device is effective in training aspirant artists to draw. Teaching artists how to see is a dominant theme in most books on the subject of learning how to draw. As explained in the book, "Drawing on the Right side of the Brain", written by Betty Edwards, the advantage of using the grid as a reference through which to view an image is that it forces the artist to draw the subject exactly as it is seen (in perspective).

Professional and recreational artists who are creating works of art are able to employ the device because the grid set on the drawing surface is completely removable. Novices and students will be able to remove the grid at an appropriate point in the development of their drawing to suit their level of skill. And, novices and students will be able to draw with immediate success without an indelible grid impairing the intrinsic value of the drawing produced.

Thus the scope of the invention should be determined by the appended claims and their legal equivalents, rather than by the examples given.

I claim:

1. An improved freehand drawing training and guiding device comprising:
    (a) a plurality of sighting grid plates having grids of varying size and constant proportion;
    (b) a plurality of grid transfer stencils having a series of holes in a grid pattern of varying size and constant proportion;
    (c) means for applying a powder color contrasting substance to a drawing surface through said holes in said grid transfer stencils to form a grid on said drawing surface in a pattern corresponding to said sighting grid plates such that an artist viewing a subject through said sighting grid plates can draw the exact shape, length, angle and position of lines representing said subject by correlating said subject to said grid on said drawing surface.

2. The device of claim 1, wherein said sighting grid plates include grid markings and said grid markings are accented along a long dimension and a short dimension of said sighting grid plate thereby providing a primary grid with subdivisions within the primary grid.

3. The device of claim 2, wherein said means for applying a powder color contrast substance is filled with said powder color contrast substance and said powder color contrast substance is released by friction when moved across edges of said holes in said grid transfer stencils, whereby said powder color contrast substance descends to said drawing surface by gravity.

4. The device of claim 3, wherein said means for applying a powder color contrast substance is by a powder-filled felt pad.

5. The device of claim 1, wherein said grid pattern on said grid transfer stencils includes a primary grid with subdivisions within the primary grid.

6. The device of claim 1, further including means for positioning and supporting said sighting grid plate comprising a coupling block having an integral pressure bar holding said sighting grid plates.

7. The device of claim 6, wherein said coupling block contains ¼–20 female thread inserts for the connection of one or more of a photographic tripod or a bendable arm assembly.

8. The device of claim 7, wherein said coupling block is connected to a bendable arm assembly, and said bendable arm assembly has a clamp for the attachment of one or more of an easel, a drawing board or a desk.

9. The device of claim 1, wherein said sighting grid plate is a mirror plate and said mirror plate has a series of holes in a grid pattern whereby an artist viewing himself in said mirror plate is a subject for self-portraiture.

10. A method for representing three-dimensional form in a two-dimensional transcription, comprising the steps of:
    providing a free hand drawing training and guiding device comprising:
        (a) a plurality of sighting grid plates having grid markings of varying size and constant proportion;
        (b) a plurality of grid transfer stencils having a series of holes in a grid pattern of varying size and constant proportion;
        (c) means for applying a powder color contrasting substance to a drawing surface through said holes in said grid transfer stencils to form a grid on said drawing surface in a pattern corresponding to said sighting grid plates; and
    composing a transcription utilizing said free hand drawing and training device.

11. The method of claim 10, wherein said sighting grid plates include grid markings, and said grid markings on said sighting grid plates include a primary grid with subdivisions within the primary grid.

12. The method of claim 11, wherein said means for applying a powder color contrast substance is filled with said powder color contrast substance and said powder color contrast substance is released by friction when moved across edges of said holes in said grid transfer stencil, whereby said powder color contrast substance descends to said drawing surface by gravity.

13. The method of claim 12, wherein said means for applying a powder color contrast substance is by a powder-filled felt pad.

14. The method of claim 12, wherein said grid on said drawing surface is removed from said surface by means of brushing or wiping said grid without deteriorating said transcription of said subject.

15. The method of claim 10, wherein said grid pattern on said grid transfer stencil includes a primary grid with subdivisions within the primary grid.

16. The method of claim 10, wherein said sighting grid plate is a mirror plate and said mirror plate has a series of holes in a grid pattern whereby an artist viewing himself in said mirror plate is a subject for self-portraiture.

17. The method of claim 10, further including means for positioning and supporting said sighting grid plate comprising a coupling block having an integral pressure bar holding said sighting grid and having ¼–20 female thread inserts for the connection of one or more of a photographic tripod or a bendable arm assembly.

* * * * *